(12) United States Patent
Rezaiifar (10) Patent No.: US 9,148,893 B2
(45) Date of Patent: Sep. 29, 2015

(54) ACCESS CHANNEL LOAD MANAGEMENT IN A WIRELESS COMMUNICATION SYSTEM

(75) Inventor: Ramin Rezaiifar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 12/393,648

(22) Filed: Feb. 26, 2009

(65) Prior Publication Data

US 2009/0219816 A1 Sep. 3, 2009

Related U.S. Application Data

(60) Provisional application No. 61/033,149, filed on Mar. 3, 2008.

(51) Int. Cl.
*G01R 31/08* (2006.01)
*H04W 74/08* (2009.01)
*H04W 28/22* (2009.01)
*H04W 48/12* (2009.01)

(52) U.S. Cl.
CPC .......... *H04W 74/0866* (2013.01); *H04W 28/22* (2013.01); *H04W 48/12* (2013.01)

(58) Field of Classification Search
USPC .......... 370/230–235, 236.1, 236.2, 253, 256, 370/391, 395.61, 395.64, 395.65, 538–545
See application file for complete search history.

(56) References Cited

U.S. PATENT DOCUMENTS

| | | | |
|---|---|---|---|
| 6,707,862 B1 * | 3/2004 | Larsson | 375/326 |
| 6,775,548 B1 * | 8/2004 | Rong et al. | 455/452.2 |
| 6,859,440 B1 * | 2/2005 | Sonti et al. | 370/252 |
| 7,454,173 B2 | 11/2008 | Wiberg et al. | |
| 2002/0082032 A1 * | 6/2002 | Hunzinger | 455/510 |
| 2003/0093526 A1 * | 5/2003 | Nandagopalan et al. | 709/225 |

(Continued)

FOREIGN PATENT DOCUMENTS

| | | |
|---|---|---|
| CN | 1734996 A | 2/2006 |
| CN | 1947388 A | 4/2007 |

(Continued)

OTHER PUBLICATIONS

Bhushan, et al. : "CDMA2000 1XEV-DO Revision A: A physical layer and MAC layer overview," IEEE Communications Magazine, IEEE Service Center, Piscataway, NJ, US, vol. 44, No. 2, Feb. 1, 2006, pp. 75-87, ISSN: 0163-6804.

(Continued)

*Primary Examiner* — Jung-Jen Liu
(74) *Attorney, Agent, or Firm* — Rupit M. Patel (57) ABSTRACT

Techniques for managing the load of an access channel in a wireless communication system are described. In an aspect, the load of the access channel may be controlled by having each terminal regulates its use of the access channel (e.g., its rate of system access) based on a rate control algorithm (e.g., token bucket). The rate control algorithm may maintain information on past activities of a terminal and may regulate the use of the access channel by the terminal based on its past activities in order to control the access channel load and achieve fairness. The system may determine at least one parameter value for the rate control algorithm based on load conditions and may broadcast the at least one parameter value to terminals. Each terminal may regulate its use of the access channel based on the at least one parameter value received from the system.

33 Claims, 5 Drawing Sheets

(56) References Cited

U.S. PATENT DOCUMENTS

| | | |
|---|---|---|
| 2004/0033807 A1* | 2/2004 | Cave .............................. 455/450 |
| 2004/0110507 A1* | 6/2004 | Ramakrishnan et al. ..... 455/445 |
| 2004/0208183 A1* | 10/2004 | Balachandran et al. . 370/395.21 |
| 2004/0214591 A1* | 10/2004 | Lott et al. ...................... 455/522 |
| 2006/0133409 A1* | 6/2006 | Prakash et al. ................ 370/450 |
| 2006/0194601 A1* | 8/2006 | Nandagopalan .............. 455/515 |
| 2007/0070903 A1 | 3/2007 | Paparella et al. |
| 2007/0070908 A1* | 3/2007 | Ghosh et al. .................. 370/236 |
| 2007/0115817 A1 | 5/2007 | Gupta et al. |
| 2007/0161394 A1* | 7/2007 | Kuroda et al. ................ 455/522 |
| 2007/0254675 A1* | 11/2007 | Zorlu Ozer et al. ........ 455/456.2 |

FOREIGN PATENT DOCUMENTS

| | | |
|---|---|---|
| CN | 101114873 A | 1/2008 |
| CN | 101132643 A | 2/2008 |
| EP | 1613007 A1 | 1/2006 |
| JP | 2005252877 A | 9/2005 |
| JP | 2007534253 A | 11/2007 |
| JP | 2009524968 A | 7/2009 |
| RU | 2316896 C2 | 2/2008 |
| WO | WO03028251 | 4/2003 |
| WO | WO2004093343 | 10/2004 |
| WO | 2005104454 A1 | 11/2005 |
| WO | 2007086005 A2 | 8/2007 |
| WO | WO-2007139188 A1 | 12/2007 |
| WO | WO2008014708 | 2/2008 |

OTHER PUBLICATIONS

International Search Report and Written Opinion—PCT/US2009/035593 International Search Authority—European Patent Office—Jul. 10, 2009.

Mingxi Fan et al; "On the reverse link performance of cdma2000 1xEV-DO revision a system" Communications, 2005. ICC 2005. 2005 IEEE International Conference on Seoul, Korea, May 16-20, 2005, Piscataway, NJ, ISA, IEEE, May 16, 2005, pp. 2244-2250, XP010826268.

Nokia Corp, et al.: "UL rate control" 3GPP Draft, R2-080947 UL Rate Control, Mobile Competence Centre, Sophia Antipolis Cedex, France, vol. RAN WG2, Sorrento, Italy, Feb. 5, 2008.

Nokia, et al.,: "RACH backoff," 3GPP Draft, R2-073057, Mobile Competence Centre, Sophia Antipolis Cedex, France, vol. RAN WG2, Aug. 15, 2007.

Taiwan Search Report—TW098106874—TIPO—Apr. 15, 2012.
Taiwan Search Report—TW098106874—TIPO—Dec. 18, 2012.
Taiwan Search Report—TW098106874—TIPO—Sep. 22, 2013.

* cited by examiner

ACCESS CHANNEL LOAD MANAGEMENT IN A WIRELESS COMMUNICATION SYSTEM

The present application claims priority to provisional U.S. Application Ser. No. 61/033,149, entitled "METHOD AND APPARATUS FOR LOAD MANAGEMENT IN WIRELESS COMMUNICATIONS," filed Mar. 3, 2008, assigned to the assignee hereof and incorporated herein by reference.

BACKGROUND

I. Field

The present disclosure relates generally to communication, and more specifically to techniques for managing load of an access channel in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of terminals. A terminal may transmit on an access channel in order to access the system and/or for other purposes. For example, the terminal may transmit on the access channel in order to register with the system when the terminal is powered on, to originate a voice or data call, to inform the system of the terminal's whereabouts so that the system can page the terminal if needed, etc.

The access channel is typically shared by all terminals in the system. Thus, if many terminals transmit on the access channel and/or if some terminals transmit frequently on the access channel, then heavy load on the access channel may increase the load of the system, delay access by terminals desiring to connect to the system, etc. It may be desirable to manage usage and hence the load of the access channel in order to avoid deleterious effects due to overload of the access channel.

SUMMARY

Techniques for managing the load of an access channel in a wireless communication system are described herein. In an aspect, the load of the access channel may be controlled by having each terminal regulate its use of the access channel (e.g., its rate of system access) based on a rate control algorithm. The rate control algorithm may maintain information on past activities of a terminal. The rate control algorithm may then regulate the use of the access channel by the terminal based on its past activities in order to control the load of the access channel and achieve fairness for each terminal. The system may determine at least one parameter value for the rate control algorithm based on load conditions, e.g., the load of the system, the load of the access channel, etc. The system may provide (e.g., broadcast) the at least one parameter value to the terminals. Each terminal may then regulate its use of the access channel based on the at least one parameter value received from the system.

In one design, a terminal may obtain the at least one parameter value for the rate control algorithm, e.g., via a broadcast transmission from the system. The terminal may use the access channel in accordance with the at least one parameter value. For example, the terminal may perform system access using the access channel and/or may send data and/or messages using the access channel in accordance with the at least one parameter value. In one design, the rate control algorithm may comprise token bucket. The terminal may obtain at least one parameter value for a token inflow rate and/or a maximum bucket level for token bucket. The terminal may limit its rate of system access based on the token inflow rate. The terminal may also limit a burst of system accesses based on the maximum bucket level.

Various aspects and features of the disclosure are described in further detail below.

DETAILED DESCRIPTION

Figure 1:
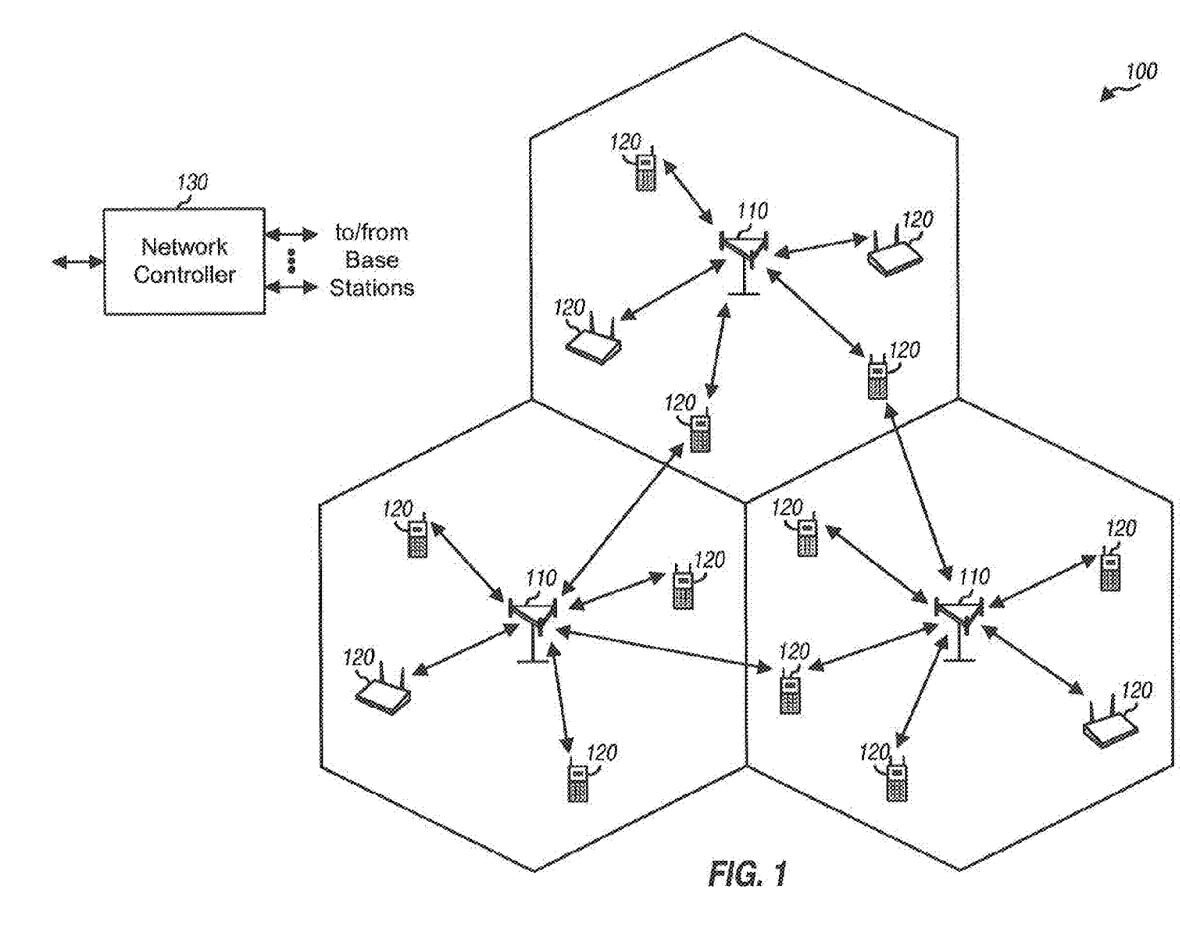
FIG. 1 shows a wireless communication system.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as cdma2000, Universal Terrestrial Radio Access (UTRA), etc. cdma2000 covers IS-2000, IS-95 and IS-856 standards. UTRA includes Wideband CDMA (WCDMA) and other variants of CDMA. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced are upcoming releases of UMTS that use E-UTRA. UTRA, E-UTRA, UMTS, LTE, LTE-Advanced and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for IS-856, which is commonly referred to as High Rate Packet Data (HRPD), CDMA2000 1xEV-DO (Evolution-Data Optimized), 1xEV-DO, etc. Also for clarity, 3GPP2 terminology is used in much of the description below FIG. 1 shows a wireless communication system 100, which may implement HRPD or any of the radio technologies mentioned above. A wireless system may also be referred to as a wireless network, an access network, a radio access network, a radio network, etc. System 100 may include a number of base stations 110 and other network entities. A base station may be a station that communicates with the terminals and may also be referred to as an access point, a Node B, an evolved Node B (eNB), etc. Each base station 110 may provide communication coverage for a particular geographic area and may support communication for the terminals located within the coverage area.

A network controller 130 may couple to a set of base stations and provide coordination and control for these base stations. Network controller 130 may be a single network entity or a collection of network entities. For example, network controller 130 may comprise a Base Station Controller (BSC), a Packet Control Function (PCF), a Packet Data Serving Node (PDSN), and/or other network entities in 3GPP2.

Terminals 120 may be dispersed throughout the system, and each terminal may be stationary or mobile. A terminal may also be referred to as an access terminal (AT), a mobile station (MS), a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the forward and reverse links. The forward link (or downlink) refers to the communication link from the base station to the terminal, and the reverse link (or uplink) refers to the communication link from the terminal to the base station.

System 100 may support one or more access channels that may be shared by all terminals. An access channel is a channel used by terminals for sending short messages, e.g., for system accesses, call originations, responses to pages, responses to messages sent by the system, registrations, etc. An access channel may also be used by terminals to send small amounts of data on the reverse link. An access channel may support low data rates, e.g., data rates of 9.6, 19.2, and 38.4 kilobits/second (Kbps) in HRPD. In general, a system may support any number of access channels, which may have different capabilities. For example, an HRPD system may support an access channel, a cdma2000 system may support an access channel and an enhanced access channel, a WCDMA system may support a physical random access channel (PRACH), and an LTE system may also support a PRACH. For clarity, much of the description below is for the access channel in HRPD.

A terminal may perform an access procedure in order to access the system. For the access procedure, the terminal may transmit one or more access probes to the system. An access probe is a transmission sent by a terminal on an access channel in order to access a system. An access probe may include a preamble used by the system to detect for the access probe and a data portion carrying information for the terminal. The system may receive an access probe from the terminal and may respond with an acknowledgment message.

Figure 2:
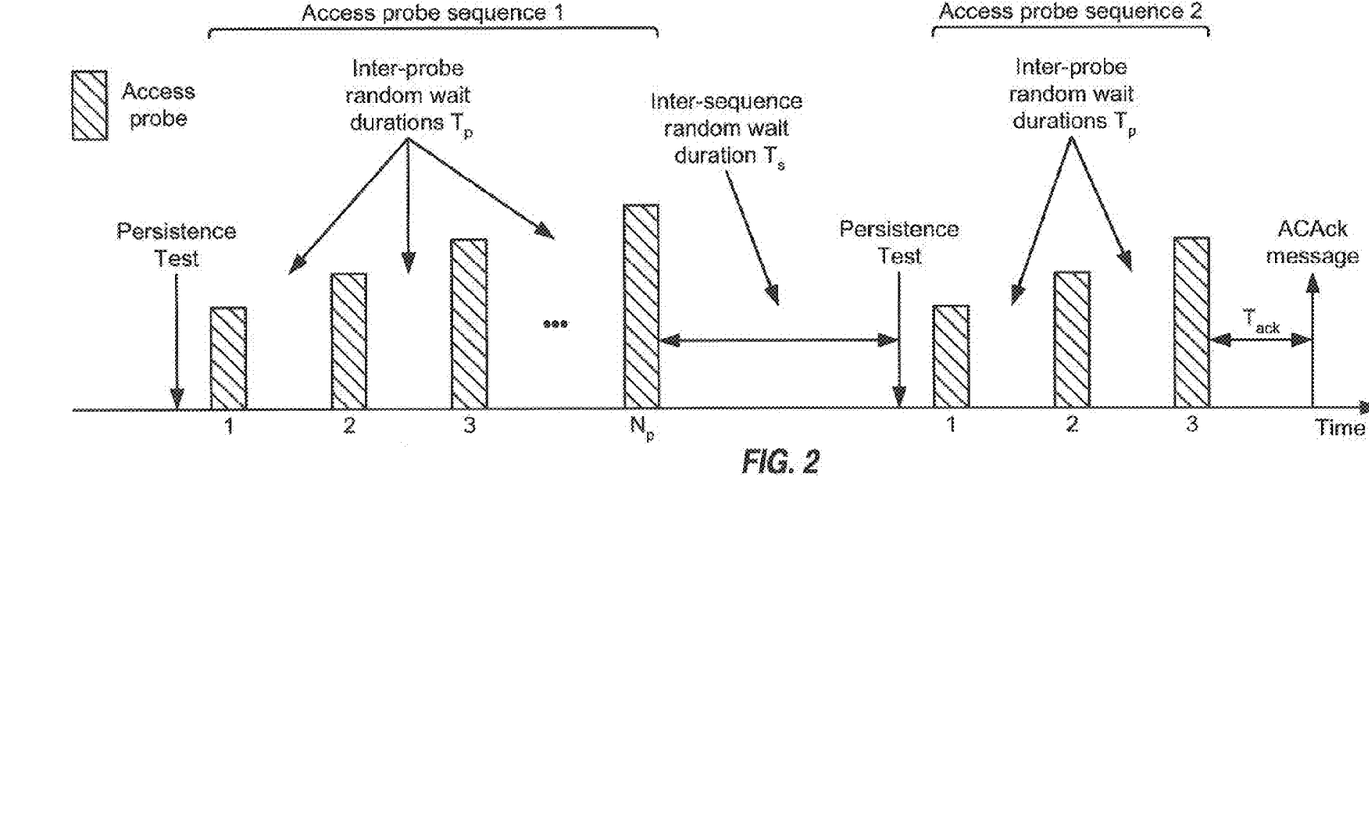
FIG. 2 shows an exemplary access procedure.

FIG. 2 shows an access procedure in HRPD. For a given system access attempt, a terminal may transmit up to $N_s$ access probe sequences to the system and may transmit up to $N_p$ access probes for each access probe sequence, where $N_p$ and $N_s$ may be configurable parameters.

The terminal performs a persistence test before starting the first access probe sequence. The persistence test is used to control congestion on the access channel. For the persistence test, the terminal generates a pseudo-random number x uniformly distributed between 0 and 1 and compares x against a persistence value q. The persistence test is successful if x is less than q and fails otherwise. If the persistence test succeeds or if 4/q consecutive persistence tests fail, then the terminal can start transmission of the first access probe sequence. Otherwise, the terminal waits a particular duration and then performs the persistence test again.

For the first access probe sequence, the terminal transmits a first access probe on the access channel and then listens for an access channel acknowledgement (ACAck) message from the system. If an ACAck message is not received, then the terminal waits a random duration of $T_p$ slots and then transmits a second access probe. The terminal transmits each subsequent access probe in similar manner, albeit at progressively higher transmit power. If the terminal transmits all $N_p$ access probes for the first access probe sequence and does not receive an ACAck message, then the terminal waits a random duration of $T_s$ slots before starting a second access probe sequence. The terminal then transmits the second access probe sequence in similar manner as the first access probe sequence, i.e., performs a persistence test and then transmits up to $N_p$ access probes if the persistence test passes. The terminal may transmit up to $N_s$ access probe sequences for the access procedure.

The terminal may access the system and establish a radio connection with the system in order to send and/or receive data over the air. The terminal may be allocated radio resources for the radio connection, e.g., may be allocated a forward traffic channel on which the terminal can receive data and/or a reverse traffic channel on which the terminal can send data. The terminal may send and/or receive data for any number of applications via the radio connection. These applications may include Voice-over-Internet Protocol (VoIP), web browsing, email, etc.

The terminal may operate in a connected state or an idle state at any given moment. In the connected state, the terminal may have a radio connection and can send and/or receive data. The terminal may transition to the idle state and terminate the radio connection if there is no data to send or receive. To conserve radio resources, the radio connection for the terminal may also be terminated if there is no activity within a timeout period. The terminal may also be directed to transition to the idle state by an overload control mechanism if the system resources are low.

The terminal may operate in the connected state and may periodically send keep-alive packets on the reverse traffic channel. The keep-alive packets may be generated by one or more applications (e.g., an email application) at the terminal in order to hold on to the radio connection. The radio connection may be terminated by the overload control mechanism. The terminal may then periodically access the system in order to establish a radio connection to send the keep-alive packets. The terminal may send one or more access probes on the access channel for each system access. The access probes would increase the load of the access channel and also the load of the reverse link.

The overload control mechanism may decrease the probability of blocking, which is the probability of a terminal being denied access to the system. However, the overload control mechanism would not prevent overload of the access channel if applications at the terminals generate frequent keep-alive packets.

Several mechanisms may be used to control the load of the access channel. In one mechanism, the persistence value may be adjusted lower in order to reduce the load of the access channel. A smaller persistence value would reduce the likelihood of a persistence test being successful and hence would lower the likelihood of another access probe sequence being sent. However, the smaller persistence value would also increase connection setup time (when the system is loaded) even for "well-behaved" terminals that have not contributed to the access channel load by periodically accessing the system. The smaller persistence value may thus unfairly impact the well-behaved terminals.

In another mechanism, a back-off period may be adjusted to reduce the load of the access channel. A terminal may send an access probe in order to access the system. The system may receive the access probe, deny connection for the terminal, and instruct the terminal to wait a back-off period of T seconds before performing another system access. A longer back-off period may be used to extend the amount of time to wait before performing another system access. However, the longer back-off period would increase connection setup time (when the system is loaded) even for well-behaved terminals.

The persistence value and/or the back-off period may be adjusted to control the load of the access channel. However, adjustment of the persistence value and/or the back-off period may not achieve fairness, since no distinction is made between the well-behaved terminals and the offending terminals. All terminals may then be impacted in the same manner.

In an aspect, the load of the access channel may be controlled by having each terminal regulate the rate at which it accesses the system based on a rate control algorithm or mechanism. In general, any rate control algorithm that uses past history to regulate the use of the access channel may be employed. The rate control algorithm may maintain information on past activities by a terminal and may regulate the use of the access channel by the terminal based on its past activities in order to control the load of the access channel and achieve fairness per terminal. The system may determine at least one value of at least one parameter for the rate control algorithm based on load conditions and may provide (e.g., broadcast) the at least one parameter value to the terminals. Each terminal may then regulate its rate of system access based on the at least one parameter value received from the system.

In a first design, load control for the access channel may be achieved based on token bucket. Token bucket is a rate control algorithm in which a terminal maintains a bucket of tokens that governs how much activity is allowed for the terminal. Tokens may be collected in the bucket at a particular rate, and each token may be used for a certain amount of activity by the terminal. For the first design, the terminal may maintain a bucket of tokens that governs the rate at which the terminal can access the system. A token may be added to the bucket at a rate of once every 1/R seconds. This rate may be referred to as a token inflow rate. The bucket can hold at most B tokens, which may be referred to as the maximum bucket level. If a token arrives when the bucket is full, then the token would be discarded. N tokens may be required to perform system access, where in general $N \leq 1$. The terminal may access the system if there are at least N tokens in the bucket and may then remove N tokens from the bucket. If the bucket contains an insufficient number of tokens, then the terminal would not access the system and may wait until N tokens have been accumulated in the bucket.

Token bucket may allow for a certain amount of burstiness in system accesses while imposing a limit on the average rate of system access. The token inflow rate R determines the number of system accesses per second by the terminal. The maximum bucket level B determines the burst of system accesses allowed for the terminal.

In one design, the system may set the values of the parameters for token bucket based on load conditions, which may cover load of the system, load of the access channel, etc. For a CDMA system, the system load may be quantified by a rise-over-thermal (RoT), which is a ratio of total noise and interference to thermal noise at a cell. The system load may be quantified by other metrics for other types of system. The load of the reverse link may comprise the load of the access channel as well as the load of other reverse link channels. The system may reduce the token inflow rate and/or the maximum bucket level when the system load is high, e.g., when the RoT exceeds an RoT threshold. In one design, two sets of parameter values may be used for token bucket—one set of parameter values for normal load and another set of parameter values for overload. In general, any number of sets of parameter values may be used for different load conditions. The system may broadcast the applicable parameter values for token bucket to the terminals. Each terminal may then operate in accordance with the token bucket parameter values received from the system.

In another design, the system may maintain multiple sets of parameter values for token bucket for different priority levels. For example, the system may have a first set of parameter values for high priority (e.g., E911 calls from emergency personnel), a second set of parameter values for normal priority, etc. The system may adjust the multiple sets of parameter values based on the load conditions, the desired performance, etc. For example, the system may maintain the token inflow rate and/or the maximum bucket level for high priority regardless of the load conditions. The system may reduce the token inflow rate and/or the maximum bucket level for normal priority for high load conditions. The system may broadcast the multiple sets of token bucket parameter values for different priority levels to the terminals. A terminal may ascertain its priority level and may then access the system using the set of token bucket parameter values applicable for its priority level.

In yet another design, the system may maintain multiple sets of parameter values for token bucket for different traffic classes or types. For example, the system may have a first set of parameter values for best effort (BE) traffic class, a second set of parameter values for expedited forwarding (EF) traffic class, etc. The system may adjust the multiple sets of parameter values based on the load conditions, the desired performance, etc. For example, the system may first reduce the token inflow rate and/or the maximum bucket level for the BE traffic class if the load conditions exceed a first threshold. The system may next reduce the token inflow rate and/or the maximum bucket level for the EF traffic class if the load conditions exceed a second threshold, which may be higher than the first threshold. The system may broadcast the multiple sets of token bucket parameter values for different traffic classes to the terminals. A terminal may ascertain the traffic class of data to be sent by the terminal. The terminal may then access the system using the set of token bucket parameter values applicable for the traffic class of the data to be sent by the terminal.

In general, multiple sets of parameter values may be maintained for any pertinent characterization, e.g., priority level, traffic class, etc. The multiple sets of parameter values may be adjusted in a suitable manner to achieve the desired performance.

In a second design, load control for the access channel may be achieved based on leaky bucket. Leaky bucket is a rate control algorithm in which a terminal maintains a bucket of activities to perform and performs the activities in the bucket at a predetermined rate. For the second design, the terminal may maintain a bucket that governs the rate at which the terminal can access the system. Whenever the terminal desires to access the system, the terminal may place a token in the bucket. The terminal may then pull tokens (if any) from the bucket at a predetermined rate and may access the system whenever a token is pulled from the bucket. For example, the terminal may be able to access the system once every S seconds. This rate may be referred to as an outflow rate. If there is a token in the bucket, then the terminal may pull the token from the bucket, access the system, and wait S seconds before pulling another token from the bucket.

Leaky bucket can shape bursty activities into a steady stream of activity that can be performed at the predetermined rate. Leaky bucket smoothes out bursts whereas token bucket allows for some burstiness. The outflow rate 1/S determines the number of system accesses per second by the terminal.

The system may set the outflow rate 1/S for leaky bucket based on the load conditions. In one design, two outflow rates may be used for leaky bucket—one outflow rate for normal load conditions and another outflow rate for overload conditions. In general, any number of outflow rates may be used for different load conditions. In another design, different outflow rates may be applicable for different priority levels and may be set based on load conditions. In yet another design, different outflow rates may be applicable for different traffic classes and may be set based on load conditions. For all designs, the system may broadcast the outflow rate(s) for leaky bucket to the terminals. Each terminal may then operate in accordance with the applicable outflow rate received from the system.

A terminal may send any number of access probes for system access. The system access may be successful after any number of access probes or may fail after all access probes have been sent. In one design, each token for token bucket or leaky bucket may be used to send one access probe, or one access probe sequence, or $N_s$ access probe sequences, or some other number of access probes, regardless of the outcome of system access. In another design, each token may be used for as many access probes as needed until system access is successful.

Load control for the access channel may also be achieved with other rate control algorithms instead of token bucket or leaky bucket. The system may adjust the values of one or more parameters for a rate control algorithm based on load conditions and may broadcast the parameter value(s) to the terminals. Each terminal may then operate in accordance with the parameter value(s) received from the system.

In one design, a terminal may maintain a single bucket for all data flows at the terminal. The terminal may perform system access for any data flow based on the tokens in the single bucket. In another design, a terminal may maintain a separate bucket for each data flow. The terminal may perform system access for each data flow based on the tokens in the bucket for that data flow. Alternatively, the terminal may be allowed to use tokens in a bucket for a higher priority data flow, even when the terminal does not have any data for the higher priority data flow.

In one design, load control for the access channel may be achieved by adjusting access parameters that are applicable for all terminals. The access parameters may comprise the persistence value and/or the back-off duration for the access procedure, the token inflow rate and/or the maximum bucket level for token bucket, the outflow rate for leaky bucket, etc. The system may broadcast the access parameters to all terminals.

In another design, load control for the access channel may be achieved by adjusting the access parameters for each terminal or each group of terminals to be controlled separately. For example, the system may adjust the access parameters for each terminal based on the number or rate of prior system accesses by the terminal, the allowed rate of system access for the terminal, the load conditions, etc. The system may collect information (e.g., the number of system accesses) for each terminal and may adjust the access parameters for that terminal based on the collected information. The system may send the access parameters to each terminal via a unicast message or to each group of terminals via a multicast message.

Figure 3:
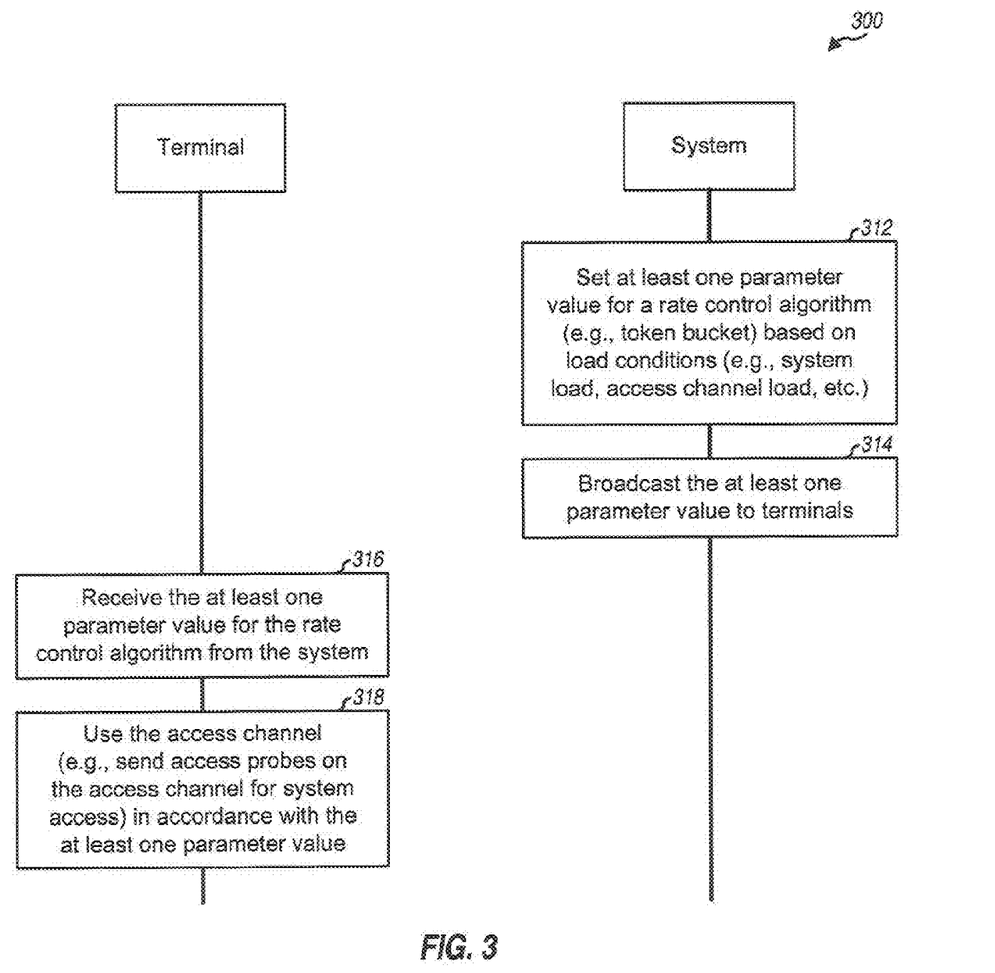
FIG. 3 shows a process for controlling the load of an access channel.

FIG. 3 shows a design of a process 300 for controlling the load of an access channel. The system may set at least one parameter value for a rate control algorithm (e.g., token bucket) based on load conditions (block 312). The at least one parameter value may control usage of the access channel in accordance with the rate control algorithm. The system may broadcast the at least one parameter value to terminals (block 314). Although not shown in FIG. 3, the system may also determine a set of at least one parameter value for each priority level or each traffic class and may broadcast multiple sets of parameter value(s) for different priority levels or different traffic classes.

A terminal may receive the at least one parameter value for the rate control algorithm from the system (block 316). The terminal may use the access channel (e.g., send access probes on the access channel for system access) in accordance with the at least one parameter value (block 318). For example, the at least one parameter value may limit the rate at which the terminal can access the system, limit bursts of system accesses, etc.

Figure 4:
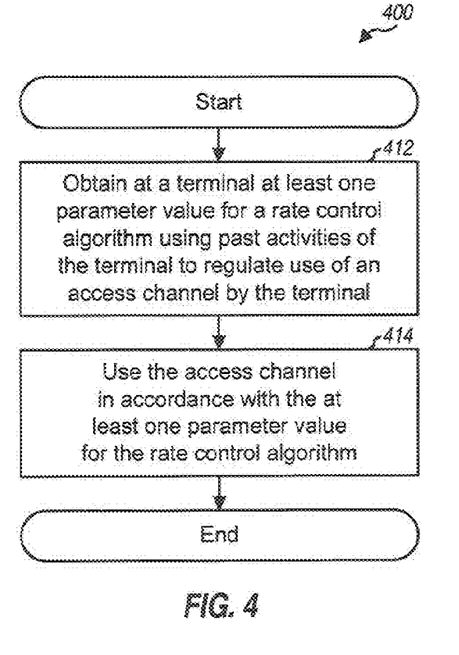
FIG. 4 shows a process performed by a terminal.

FIG. 4 shows a design of a process 400 performed by a terminal to operate in a wireless communication system. The terminal may obtain at least one parameter value for a rate control algorithm that uses past activities of the terminal to regulate use of an access channel by the terminal (block 412). The terminal may use the access channel in accordance with the at least one parameter value for the rate control algorithm (block 414). The rate control algorithm may keep track of activities of the terminal over time and may use the activity history to regulate use of the access channel by the terminal. The rate control algorithm may thus keep state information for the terminal and may use the state information to control the load of the access channel and achieve fairness per terminal.

In one design of block 412, the terminal may receive a broadcast transmission from the system and may obtain the at least one parameter value for the rate control algorithm from the broadcast transmission. In other designs, the terminal may receive the at least one parameter value via a unicast message sent to the terminal or via a multicast message sent to a group of terminals. The terminal may obtain the at least one parameter value at connection time. The terminal may also obtain updated parameter values at other times, In one design of block 414, the terminal may perform system access in accordance with the at least one parameter value for the rate control algorithm. For example, the terminal may determine an allowed rate of system access based on the at least one parameter value. The terminal may then perform system access in accordance with the allowed rate of system access. The terminal may send at least one access probe on the access channel for each system access. In another design, the terminal may send data and/or messages on the access channel in accordance with the at least one parameter value.

In one design, the rate control algorithm may comprise token bucket. The terminal may obtain at least one parameter value for a token inflow rate and/or a maximum bucket level for token bucket. The terminal may add tokens to a bucket in accordance with the token inflow rate and may limit the number of tokens in the bucket based on the maximum bucket level. The terminal may determine whether it can access the system based on tokens in the bucket. The terminal may limit its rate of system access based on the token inflow rate. The terminal may also limit a burst of system accesses based on the maximum bucket level. The rate control algorithm may also comprise leaky bucket or some other algorithm that can use state information to control the load of the access channel and achieve fairness per terminal.

In one design, one set of at least one parameter value may be applicable for all terminals. In another design, multiple sets of at least one parameter value may be applicable for different priority levels. The terminal may then use the access channel in accordance with a set of at least one parameter value applicable for a priority level of the terminal. In yet another design, multiple sets of at least one parameter value may be applicable for different traffic classes. The terminal may then use the access channel in accordance with a set of at least one parameter value applicable for a traffic class of data to be sent by the terminal. Multiple sets of at least one parameter value may also be applicable for other characterizations.

Figure 5:
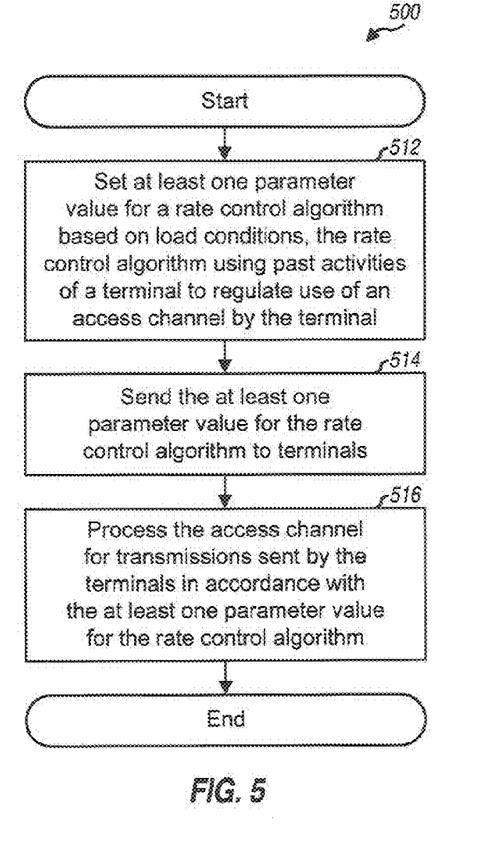
FIG. 5 shows a process for supporting operation in a wireless system.

FIG. 5 shows a design of a process 500 for supporting operation of terminals in a wireless communication system. Process 500 may be performed by one or more network entities, e.g., by a base station and possibly a network controller.

At least one parameter value for a rate control algorithm may be set based on load conditions (block 512). The rate control algorithm may use past activities of a terminal to regulate use of an access channel by the terminal. The load conditions may comprise the load of the system (e.g., an RoT for a CDMA system), the load of the access channel, etc.

The at least one parameter value for the rate control algorithm may be sent to terminals (block 514). In one design, a broadcast transmission comprising the at least one parameter value for the rate control algorithm may be sent to all terminals. In other designs, the at least one parameter value may be sent to each terminal via a unicast message or to each group of terminals via a multicast message.

The access channel may be processed for transmissions sent by the terminals in accordance with the at least one parameter value for the rate control algorithm (block 516). In one design, the access channel may be processed for access probes sent by the terminals for system access. System access by each terminal may be regulated by the at least one parameter value for the rate control algorithm. In other designs, the access channel may be processed for data and/or messages sent by the terminals in accordance with the at least one parameter for the rate control algorithm.

In one design, the rate control algorithm may comprise token bucket. At least one parameter value for a token inflow rate and/or a maximum bucket level for token bucket may be set based on the load conditions. System access by each terminal may be limited by the token inflow rate. A burst of system accesses by each terminal may be limited by the maximum bucket level. The rate control algorithm may also comprise leaky bucket or some other algorithm that can use state information to control the load of the access channel and achieve fairness per terminal.

In one design, a set of at least one parameter value may be applicable for all terminals. In another design, multiple sets of at least one parameter value for different priority levels may be set based on the load conditions and may be sent to the terminals. The access channel may then be processed for transmissions sent by each terminal in accordance with a set of at least one parameter value applicable for a priority level of that terminal. In another design, multiple sets of at least one parameter value for different traffic classes may be set based on the load conditions and sent to the terminals. The access channel may then be processed for transmissions sent by each terminal in accordance with a set of at least one parameter value applicable for a traffic class of data to be sent by that terminal. Multiple sets of at least one parameter value may also be applicable for other characterizations.

The techniques described herein may allow the system to manage the load of the access channel by regulating the rate at which the terminals can access the system. The regulation may be achieved by adjusting parameter values for token bucket, leaky bucket, or some other rate control algorithm to control the number of system accesses per second allowed for the terminals. The system can adjust the parameter value(s) based on the system load, the access channel load, etc. The system can thus control the rate of system access by the terminals to obtain the desired system load or access channel load. The parameter value(s) may be applicable for all terminals. In this case, the system can set the parameter value(s) without having to maintain information about each individual terminal. The rate control algorithm may be executed by each terminal, which may reduce complexity for the system. However, the system can control the system load and/or the access channel load by varying the parameter value(s) for the rate control algorithm.

For clarity, the techniques have been described specifically for load control or management of an access channel. The techniques may also be used for load control of other overhead channels or control channels that may be shared by multiple terminals. For a given shared channel, at least one parameter value for a rate control algorithm may be set, e.g., based on load conditions. Use of the shared channel by terminals may then be controlled by the at least one parameter value.

Figure 6:
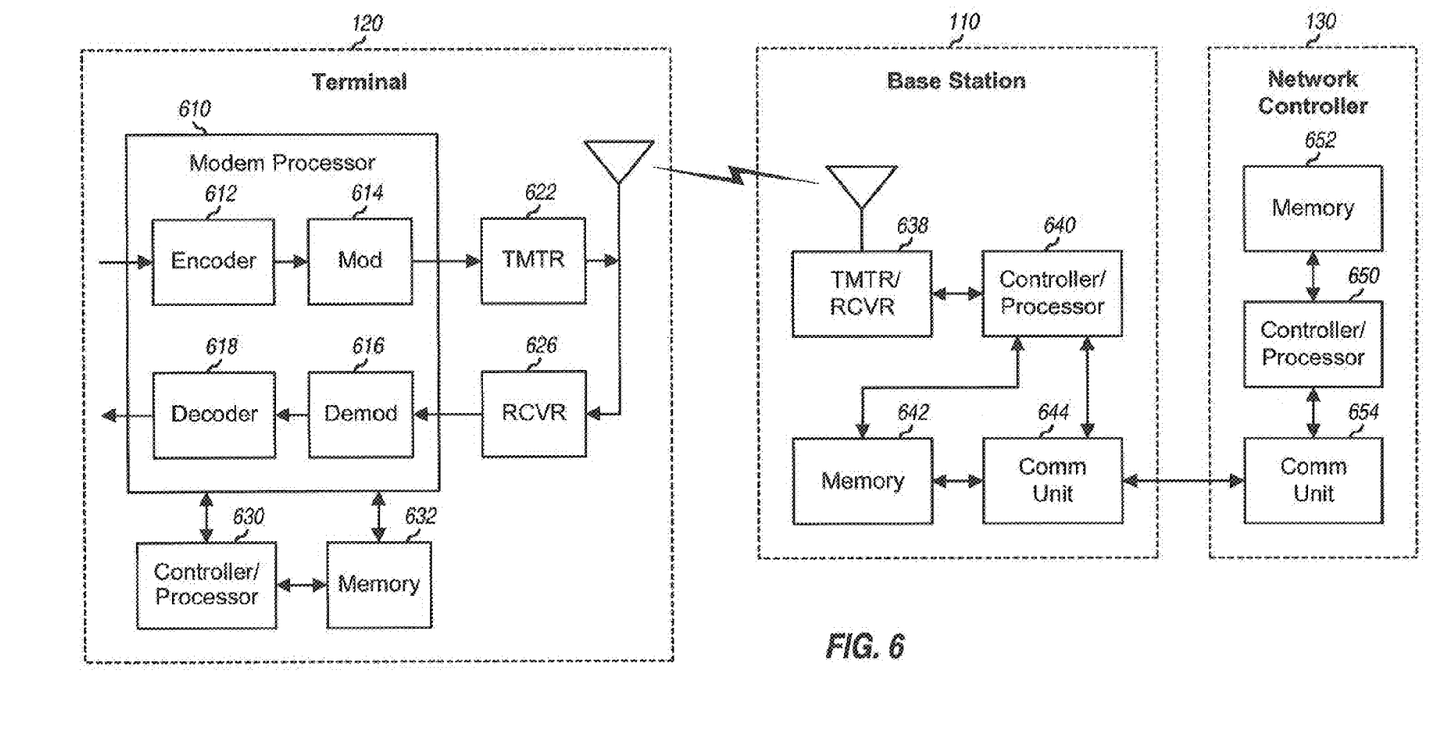
FIG. 6 shows a block diagram of a terminal, a base station, and a network controller.

FIG. 6 shows a block diagram of a design of a terminal 120, a base station 110, and network controller 130. Terminal 120 may be one of the terminals in FIG. 1, and base station 110 may be one of the base stations in FIG. 1. At terminal 120, an encoder 612 may receive data and messages (e.g., access probes) to be sent by terminal 120 on the reverse link. Encoder 612 may process (e.g., encode and interleave) the data and messages. A modulator (Mod) 614 may further process (e.g., modulate, channelize, and scramble) the encoded data and messages and provide output samples. A transmitter (TMTR) 622 may condition (e.g., convert to analog, filter, amplify, and frequency upconvert) the output samples and generate a reverse link signal, which may be transmitted to base station 110.

On the forward link, terminal 120 may receive a forward link signal from base station 110. A receiver (RCVR) 626 may condition (e.g., filter, amplify, frequency downconvert, and digitize) a received signal and provide input samples. A demodulator (Demod) 616 may process (e.g., descramble, channelize, and demodulate) the input samples and provide symbol estimates. A decoder 618 may process (e.g., deinterleave and decode) the symbol estimates and provide decoded data and messages sent to terminal 120. Encoder 612, modulator 614, demodulator 616 and decoder 618 may be implemented by a modem processor 610. These units may perform processing in accordance with the radio technology (e.g., HRPD, WCDMA, LTE, etc.) used by the system. A controller/processor 630 may direct the operation of various units at terminal 120. Processor 630 and/or other units at terminal 120 may perform or direct part of process 300 in FIG. 3, process 400 in FIG. 4, and/or other processes for the techniques described herein. Memory 632 may store program codes and data for terminal 120.

At base station 110, a transmitter/receiver 638 may support radio communication for terminal 120 and other terminals. A controller/processor 640 may perform various functions for communication with the terminals. For the reverse link, the reverse link signal from terminal 120 may be received and conditioned by receiver 638 and further processed by controller/processor 640 to recover the data and messages (e.g., access probes) sent by the terminal. For the forward link, data and messages (e.g., messages comprising parameter values for token bucket or some other rate control algorithm) may be processed by controller/processor 640 and conditioned by transmitter 638 to generate a forward link signal, which may be transmitted to terminal 120 and other terminals. Processor 640 and/or other units at base station 110 may perform part of the process 300 in FIG. 3, all or part of process 500 in FIG. 5, and/or other processes for the techniques described herein. Memory 642 may store program codes and data for the base station. A communication (Comm) unit 644 may support communication with network controller 130 and/or other network entities.

At network controller 130, a controller/processor 650 may perform various functions to support communication services for the terminals. Processor 650 and/or other units at network controller 130 may perform part of process 300 in FIG. 3, all or part of process 500 in FIG. 5, and/or other processes for the techniques described herein. Memory 652 may store program codes and data for network controller 130. A communication unit 654 may support communication with the base stations and other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of operating a terminal in a wireless communication system, comprising:

obtaining at least one parameter value for a rate control algorithm used to determine in a terminal a rate for probing an access channel, the at least one parameter value based on load conditions of the access channel and obtained prior to probing the access channel, the rate control algorithm tracking and using at the terminal past activities of the terminal to determine at the terminal the rate for probing the access channel by the terminal for communication with a base station, the rate for probing the access channel defining a duration between subsequent probes; and using the access channel in accordance with the at least one parameter value for the rate control algorithm.

2. The method of claim 1, wherein the using the access channel comprises performing system access in accordance with the at least one parameter value for the rate control algorithm, and
sending at least one access probe on the access channel for each system access.

3. The method of claim 1, wherein the using the access channel comprises
determining an allowed rate of system access based on the at least one parameter value, and
performing system access in accordance with the allowed rate of system access.

4. The method of claim 1, wherein the using the access channel comprises sending data or messages on the access channel in accordance with the at least one parameter value for the rate control algorithm.

5. The method of claim 1, wherein the rate control algorithm comprises token bucket, and wherein the obtaining at least one parameter value comprises obtaining at least one parameter value for at least one of a token inflow rate and a maximum bucket level for token bucket.

6. The method of claim 5, further comprising:
adding tokens to a bucket in accordance with the token inflow rate;
determining whether the terminal can access the system based on tokens in the bucket; and
limiting a rate of system access by the terminal based on the token inflow rate.

7. The method of claim 6, further comprising:
limiting the number of tokens in the bucket based on the maximum bucket level, wherein a burst of system accesses by the terminal is limited by the maximum bucket level.

8. The method of claim 1, wherein multiple sets of at least one parameter value are applicable for different priority levels, and wherein the using the access channel comprises using the access channel in accordance with a set of at least one parameter value applicable for a priority level of the terminal.

9. The method of claim 1, wherein multiple sets of at least one parameter value are applicable for different traffic classes, and wherein the using the access channel comprises using the access channel in accordance with a set of at least one parameter value applicable for a traffic class of data to be sent by the terminal.

10. The method of claim 1, wherein the obtaining at least one parameter value comprises
receiving a broadcast transmission from the system, and
obtaining the at least one parameter value for the rate control algorithm from the broadcast transmission.

11. An apparatus in a wireless communication system, comprising:
at least one processor configured to obtain at least one parameter value for a rate control algorithm used to determine in a terminal a rate for probing an access channel, the at least one parameter value based on load conditions of the access channel and obtained prior to probing the access channel, the rate control algorithm tracking and using at the terminal past activities of the terminal to determine at the terminal the rate for probing the access channel by the terminal for communication with a base station, the rate for probing the access channel defining a duration between subsequent probes, and to use the access channel in accordance with the at least one parameter value for the rate control algorithm.

12. The apparatus of claim 11, wherein the at least one processor is configured to perform system access in accordance with the at least one parameter value for the rate control algorithm, and to send at least one access probe on the access channel for each system access.

13. The apparatus of claim 11, wherein the at least one processor is configured to determine an allowed rate of system access based on the at least one parameter value, and to perform system access in accordance with the allowed rate of system access.

14. The apparatus of claim 11, wherein the rate control algorithm comprises token bucket, and wherein the at least one processor is configured to obtain at least one parameter value for at least one of a token inflow rate and a maximum bucket level for token bucket, to limit a rate of system access based on the token inflow rate, and to limit a burst of system accesses based on the maximum bucket level.

15. The apparatus of claim 11, wherein multiple sets of at least one parameter value are applicable for different priority levels, and wherein the at least one processor is configured to use the access channel in accordance with a set of at least one parameter value applicable for a priority level of the terminal.

16. An apparatus in a wireless communication system, comprising:
means for obtaining at least one parameter value for a rate control algorithm used to determine in a terminal a rate for probing an access channel, the at least one parameter value based on load conditions of the access channel and obtained prior to probing the access channel, the rate control algorithm tracking and using at the terminal past activities of the terminal to determine at the terminal the rate for probing the access channel by the terminal for communication with a base station, the rate for probing the access channel defining a duration between subsequent probes; and
means for using the access channel in accordance with the at least one parameter value for the rate control algorithm.

17. The apparatus of claim 16, wherein the means for using the access channel comprises
means for performing system access in accordance with the at least one parameter value for the rate control algorithm, and
means for sending at least one access probe on the access channel for each system access.

18. The apparatus of claim 16, wherein the means for using the access channel comprises
means for determining an allowed rate of system access based on the at least one parameter value, and
means for performing system access in accordance with the allowed rate of system access.

19. The apparatus of claim 16, wherein the rate control algorithm comprises token bucket, wherein the means for obtaining at least one parameter value comprises means for obtaining at least one parameter value for at least one of a token inflow rate and a maximum bucket level for token bucket, and wherein the means for using the access channel comprises
means for limiting a rate of system access based on the token inflow rate, and
means for limiting a burst of system accesses based on the maximum bucket level.

20. The apparatus of claim 16, wherein multiple sets of at least one parameter value are applicable for different priority levels, and wherein the means for using the access channel comprises means for using the access channel in accordance with a set of at least one parameter value applicable for a priority level of the terminal.

21. A computer program product, comprising:
non-transitory computer-readable medium comprising:
code for causing at least one computer to obtain at least one parameter value for a rate control algorithm used to determine in a terminal a rate for probing an access channel, the at least one parameter value based on load conditions of the access channel and obtained prior to probing the access channel, the rate control algorithm tracking and using at the terminal past activities of the terminal to determine at the terminal the rate for probing the access channel by the terminal for communication with a base station, the rate for probing the access channel defining a duration between subsequent probes, and code for causing the at least one computer to use the access channel in accordance with the at least one parameter value for the rate control algorithm.

22. A method of supporting operation of terminals in a wireless communication system, comprising:

setting at least one parameter value for a rate control algorithm based on load conditions of an access channel in the system and obtained prior to probing the access channel, the rate control algorithm used to determine in a terminal a rate for probing the access channel, the rate control algorithm tracking and using at the terminal past activities of the terminal to determine at the terminal the rate for probing the access channel by the terminal for communication with a base station, the rate for probing the access channel defining a duration between subsequent probes;

sending the at least one parameter value for the rate control algorithm to terminals; and processing the access channel for transmissions sent by the terminals in accordance with the at least one parameter value for the rate control algorithm.

23. The method of claim 22, wherein the processing the access channel comprises processing the access channel for access probes sent by the terminals for system access, and wherein system access by each terminal is regulated by the at least one parameter value for the rate control algorithm.

24. The method of claim 22, wherein the rate control algorithm comprises token bucket, and wherein the setting at least one parameter value comprises setting at least one parameter value for at least one of a token inflow rate and a maximum bucket level for token bucket.

25. The method of claim 24, wherein the processing the access channel comprises processing the access channel for access probes sent by the terminals for system access, wherein system access by each terminal is limited by the token inflow rate.

26. The method of claim 25, wherein a burst of system accesses by each terminal is limited by the maximum bucket level.

27. The method of claim 22, wherein the setting at least one parameter value comprises setting multiple sets of at least one parameter value for different priority levels based on the load conditions, wherein the sending the at least one parameter value comprises sending the multiple sets of at least one parameter to the terminals, and wherein the processing the access channel comprises processing the access channel for transmissions sent by each of the terminals in accordance with a set of at least one parameter value applicable for a priority level of the terminal.

28. The method of claim 22, wherein the setting at least one parameter value comprises setting multiple sets of at least one parameter value for different traffic classes based on the load conditions, wherein the sending the at least one parameter value comprises sending the multiple sets of at least one parameter to the terminals, and wherein the processing the access channel comprises processing the access channel for transmissions sent by each of the terminals in accordance with a set of at least one parameter value applicable for a traffic class of data to be sent by the terminal.

29. The method of claim 22, wherein the sending the at least one parameter comprises sending a broadcast transmission comprising the at least one parameter value for the rate control algorithm.

30. An apparatus in a wireless communication system, comprising:

at least one processor configured to set at least one parameter value for a rate control algorithm based on load conditions of an access channel in the system and obtained prior to probing the access channel, the rate control algorithm used to determine in a terminal a rate for probing the access channel, the rate control algorithm tracking and using at the terminal past activities of the terminal to determine at the terminal the rate for probing the access channel by the terminal for communication with a base station, the rate for probing the access channel defining a duration between subsequent probes, to send the at least one parameter value for the rate control algorithm to terminals, and to process the access channel for transmissions sent by the terminals in accordance with the at least one parameter value for the rate control algorithm.

31. The apparatus of claim 30, wherein the at least one processor is configured to process the access channel for access probes sent by the terminals for system access, and wherein system access by each terminal is regulated by the at least one parameter value for the rate control algorithm.

32. The apparatus of claim 30, wherein the rate control algorithm comprises token bucket, wherein the at least one processor is configured to set at least one parameter value for at least one of a token inflow rate and a maximum bucket level for token bucket, and to process the access channel for access probes sent by the terminals for system access, wherein system access by each terminal is limited by the token inflow rate, and wherein a burst of system accesses by each terminal is limited by the maximum bucket level.

33. The apparatus of claim 30, wherein the at least one processor is configured to set multiple sets of at least one parameter value for different priority levels based on the load conditions, to send the multiple sets of at least one parameter to the terminals, and to process the access channel for transmissions sent by each of the terminals in accordance with a set of at least one parameter value applicable for a priority level of the terminal.

* * * * *